US012690092B2

(12) United States Patent
Yang

(10) Patent No.: US 12,690,092 B2
(45) Date of Patent: Jul. 21, 2026

(54) METHOD AND APPARATUS FOR SELECTING DESTINATION ADDRESS IN SIDELINK, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 500 days.

(21) Appl. No.: 17/910,347

(22) PCT Filed: Mar. 12, 2020

(86) PCT No.: PCT/CN2020/079041
§ 371 (c)(1),
(2) Date: Sep. 8, 2022

(87) PCT Pub. No.: WO2021/179263
PCT Pub. Date: Sep. 16, 2021

(65) Prior Publication Data
US 2023/0156855 A1     May 18, 2023

(51) Int. Cl.
*H04W 76/28* (2018.01)
*H04W 52/02* (2009.01)
(52) U.S. Cl.
CPC ....... *H04W 76/28* (2018.02); *H04W 52/0232* (2013.01)
(58) Field of Classification Search
None
See application file for complete search history.

(56) References Cited

U.S. PATENT DOCUMENTS

| | | | |
|---|---|---|---|
| 2015/0327323 A1 | 11/2015 | Wang et al. | |
| 2020/0053768 A1 | 2/2020 | Chen et al. | |
| 2021/0227465 A1* | 7/2021 | Kung .................... | H04W 76/28 |
| 2022/0182979 A1* | 6/2022 | Freda ................. | H04W 72/569 |
| 2022/0264533 A1* | 8/2022 | Zhang .................. | H04L 1/1812 |
| 2022/0279537 A1* | 9/2022 | Freda .................... | H04W 72/23 |
| 2023/0014303 A1* | 1/2023 | Di Girolamo ........ | H04W 72/20 |

(Continued)

FOREIGN PATENT DOCUMENTS

| | | |
|---|---|---|
| CN | 101500299 A1 | 8/2009 |
| CN | 104219738 A1 | 12/2014 |

(Continued)

OTHER PUBLICATIONS

JPOA of Application No. 2022554413 dated on Sep. 26, 2023 with English translation,(6p).

(Continued)

*Primary Examiner* — Scott M Sciacca
(74) *Attorney, Agent, or Firm* — Arch & Lake LLP; Hao Tan; Shen Wang

(57) ABSTRACT

A method for selecting a destination address in a sidelink includes: determining, by a terminal, a discontinuous reception (DRX) parameter and a DRX state of a destination address corresponding to a logical channel on which there is data to be transmitted; and selecting, on the basis of the DRX parameter, the DRX state and a logical channel priority of the logical channel, a destination address configured to transmit the data to be transmitted.

16 Claims, 5 Drawing Sheets determine a discontinuous reception (DRX) parameter and a DRX state of a destination address corresponding to a logical channels ⟋ S11 select a destination address configured to transmit data to be transmitted based on the DRX parameter, the DRX state, and a logical channel priority ⟋ S12

(56)                    References Cited

U.S. PATENT DOCUMENTS

| | | | | |
|---|---|---|---|---|
| 2023/0064488 A1* | 3/2023 | Han | ..................... | H04W 76/28 |
| 2023/0088615 A1* | 3/2023 | Zhao | ..................... | H04W 4/06 |
| | | | | 370/311 |

FOREIGN PATENT DOCUMENTS

| | | | |
|---|---|---|---|
| CN | 107484249 A1 | 12/2017 |
| CN | 109246830 A1 | 1/2019 |
| JP | 2021118545 A | 8/2021 |
| WO | 2020006366 A1 | 1/2020 |

OTHER PUBLICATIONS

International Search Report issued in Application No. PCT/CN2020/079041 dated Dec. 10, 2020, (4p).

Extended European Search Report of EP Application No. 20924040.7 dated Mar. 24, 2023, (12p).

First Office Action issued to Chinese Application No. 202080000533.3 dated Dec. 1, 2022 with English translaction, (13p).

First Office Action issued to Russian Application No. 2022126416 dated May 30, 2023 with English translation, (16p).

Ericsson, "Running CR on 36.321 for eMTC", LTE_eMTC5-Core, 3GPP TSG-RAN WG2 Meeting #109-e, R2-2000976, Electronic Meeting, Feb. 24-Mar. 6, 2020, (17p).

\* cited by examiner

| V | R | R | R | R | Oct(byte) 1 |

Octt(byte) 2

SRC — Octt(byte) 3

Oct t(byte) 4

Oct t(byte) 5

DST — Octt(byte) 6

Octt(byte) 7

S11 determine a discontinuous reception (DRX) parameter and a DRX state of a destination address corresponding to a logical channels

S12 select a destination address configured to transmit data to be transmitted based on the DRX parameter, the DRX state, and a logical channel priority

100

101 determining unit

102 selecting unit

103 transmitting unit

METHOD AND APPARATUS FOR SELECTING DESTINATION ADDRESS IN SIDELINK, AND STORAGE MEDIUM

CROSS-REFERENCE TO RELATED APPLICATION

This application is a U.S. national phase application of International Application No. PCT/CN2020/079041, filed on Mar. 12, 2020, the content of which is hereby incorporated by reference in its entirety for all purposes.

TECHNICAL FIELD

The disclosure relates to a field of communication technologies, and more particularly, to a method and a device for selecting a destination address in sidelink and a storage medium.

BACKGROUND

In order to support sidelink communication between terminals, a sidelink communication mode is introduced. In the sidelink communication mode, the addressing is performed for the sidelink transmission through the source identifier and destination identifier of the Medium Access Control (MAC) layer, and there is no need to establish a connection before the sidelink transmission.

Multiple logical channels can be established between terminals performing the sidelink communication, for data transmission. After receiving a sidelink grant resource, the terminal selects a logical channel to transmit data through a logical channel prioritization (LCP).

SUMMARY

According to a first aspect, a method for selecting a destination address in sidelink is provided, which is performed by a terminal. The method includes:

determining a discontinuous reception (DRX) parameter and a DRX state of a destination address corresponding to a logical channel, in which the logical channel is a logical channel on which there is data to be transmitted; selecting a destination address configured to transmit the data to be transmitted based on the DRX parameter, the DRX state, and a logical channel priority of the logical channel.

According to a second aspect, a device for selecting a destination address in sidelink is provided. The device includes:

a processor; and a memory for storing instructions executable by the processor; in which the processor is configured to execute a method for selecting a destination address in sidelink described in the first aspect or any one of the implementations of the first aspect.

According to a third aspect, there is provided a non-transitory computer-readable storage medium. When instructions in the storage medium are executed by a processor of a mobile terminal, the mobile terminal is caused to execute a method for selecting a destination address in sidelink described in the first aspect or any one of the implementations of the first aspect.

It is understandable that the above general description and the following detailed description are explanatory and are used as examples, and cannot limit the disclosure.

BRIEF DESCRIPTION OF THE DRAWINGS

The accompanying drawings, which are incorporated in and constitute a part of this specification, illustrate examples consistent with the disclosure and serve to explain the principles of the examples of the disclosure together with the description.

DETAILED DESCRIPTION

Embodiments will be described in detail herein, examples of which are illustrated in the accompanying drawings. In the following description related to the drawings, the same numerals in different drawings refer to the same or similar elements unless otherwise indicated. The implementations described in the following embodiments do not represent all implementations consistent with embodiments of the disclosure. Rather, they are merely examples of apparatus and methods consistent with some aspects of embodiments of the disclosure as recited in the appended claims.

In order to save the power consumption of the terminal, the network device can configure discontinuous reception (DRX) for the terminal. The DRX configuration includes an inactivity timer, an on-duration timer, a cycle and a start offset, etc. The terminal may only monitor the physical downlink control channel (PDCCH) when the inactivity timer is started and during an on-duration period, and the terminal may not monitor the PDCCH channel at other times, thereby saving the power consumption. Whenever the terminal receives a DCI carrying its own C-RNTI on the PDCCH, it will start the inactivity timer. The terminal will also periodically start the on-duration timer.

Figure 1:
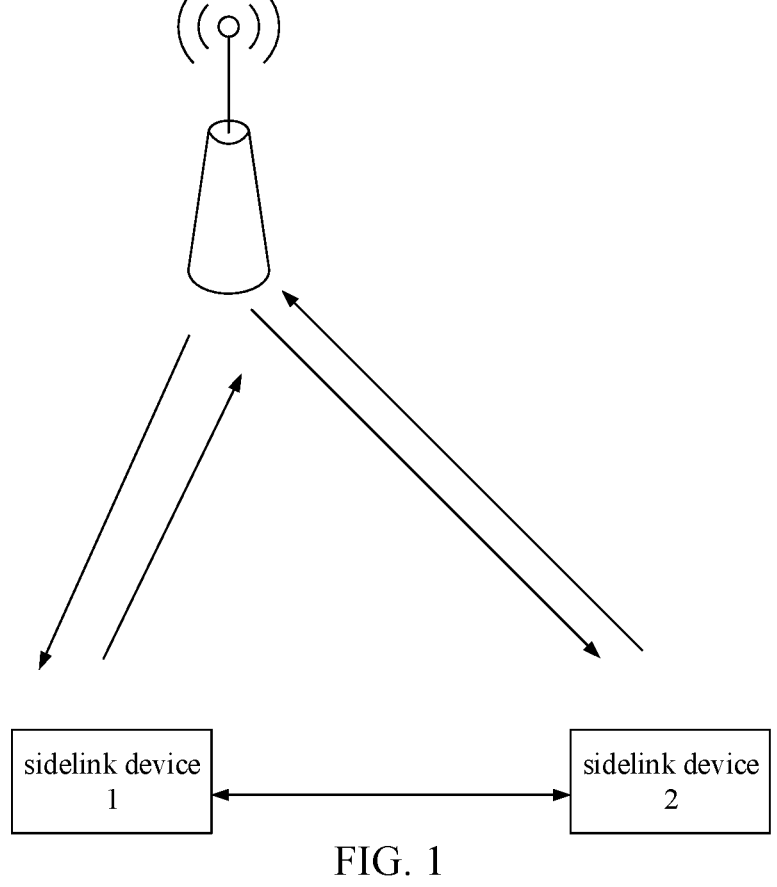
FIG. 1 is a schematic diagram illustrating a sidelink communication system in accordance with an example of the disclosure.

The sidelink communication method according to examples of the disclosure can be applied to a sidelink communication system illustrated in FIG. 1. As illustrated in FIG. 1, in a scenario in which sidelink communication devices perform sidelink communication, the network device configures transmission parameters configured to transmit data for a sidelink communication device 1. The sidelink communication device 1 serves as a data transmitting end, and the sidelink communication device 2 serves as a data receiving end, and these two performs the sidelink communicate. The link for performing the communication between the network device and the sidelink communication devices is uplink and downlink, and the link between the sidelink communication devices is sidelink. The communication between the sidelink communication equipment and other devices can be transferred through the base station and the core network, that is, the uplink and downlink between the user equipment and the base station in the existing cellular network is used for communication, or the sidelink between devices can be directly used for communication.

Compared with Uu interface communication, the sidelink communication has characteristics of short delay and low overhead, such that the sidelink communication is suitable for the communication between the sidelink device and other surrounding devices that are at close geographical locations to the sidelink device.

The disclosure relates to a scenario where the sidelink communication is performed between sidelink communication devices, such as a scenario where the radio communication is performed between a vehicle and other nodes (V2X), where V represents an on-vehicle equipment and X represents an object interacting with the on-vehicle equipment. Currently, X mainly includes on-vehicle devices, handheld devices, traffic roadside infrastructure and networks. The V2X interaction modes include: interactions of Vehicle to Vehicle (V2V), Vehicle to Infrastructure (V2I), Vehicle to Pedestrian (V2P), Vehicle to Network (V2N). In the disclosure, the communication scenario of the sidelink communication between the sidelink communication devices may also be a Device to Device (D2D) communication scenario. The sidelink communication devices configured to perform the sidelink communication in examples of the disclosure may include various handheld devices, on-vehicle devices, wearable devices, computing devices, or other processing devices connected to wireless modems with wireless communication functions, as well as various forms of user equipment (UE), mobile stations (MS), terminals, terminal equipment and so on.

Figure 2:
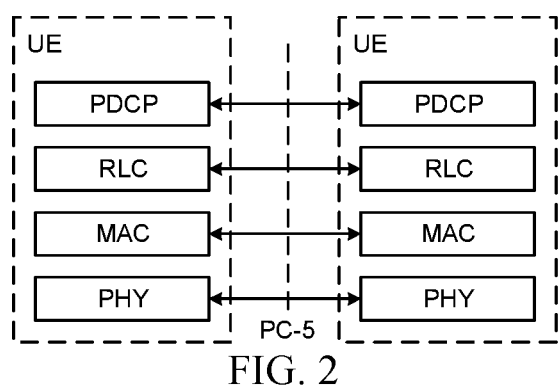
FIG. 2 is a schematic diagram illustrating a sidelink protocol stack in accordance with an example of the disclosure.

In the 4G era, the sidelink communication mode was introduced. The protocol stack of the sidelink communication mode is illustrated in FIG. 2, including a Packet Data Convergence Protocol (PDCP) layer, a Radio Link Control (RLC) layer, a MAC layer, and a Physical (PHY) layer. The interface between the terminals is PC-5. The transmission of the sidelink performs the addressing through the source identifier and destination identifier of the MAC layer, and there is no need to establish the connection before the transmission. There is only the data radio bearer (DRB) on the sidelink for data transmission. Each DRB corresponds to an individual logical channel. Multiple logical channels can be established between a source terminal and a destination terminal for the data transmission.

Figure 3:
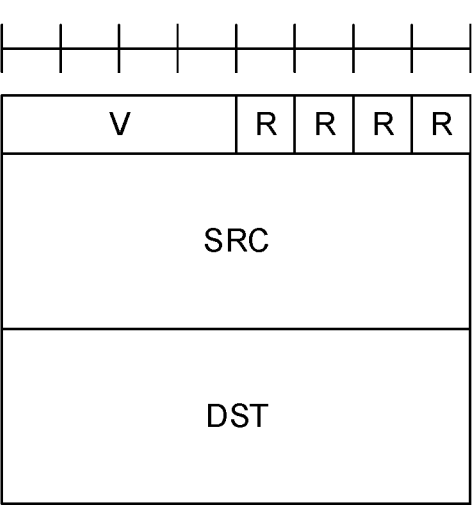
FIG. 3 is a diagram illustrating a structure of a MAC SL-SCH subheader in accordance with an example of the disclosure.

The sidelink transmission performs the addressing through the source identifier and destination identifier carried in the MAC SL-SCH subheader, and there is no need to establish a connection before the transmission. The structure of the MAC SL-SCH subheader is illustrated in FIG. 3, where the source (SRC) is a Layer 2 identifier of a source terminal and the destination (DST) is a Layer 2 identifier of a destination terminal. The Layer 2 identifier is generated by an application layer and provided to the Access Stratum (AS) to identify a sidelink terminal.

There are two resource allocation methods on the sidelink, one is a dynamic scheduling method by the network device, and the other is an autonomous selection method by the terminal from a resource pool broadcast by the network device. The dynamic scheduling method means that the network device dynamically allocates the transmission resources on the sidelink to the terminal according to the buffered data report of the terminal, while the autonomous selection method means that the terminal randomly selects the transmission resources from the resource pool broadcast or pre-configured by the network device. The resource pool of the dynamic scheduling method and the resource pool of the autonomous selection method are separated. The network equipment allocates resources uniformly in the dynamic scheduling method. Therefore, a reasonable algorithm can be adopted to avoid collisions between different terminals.

Figure 4:
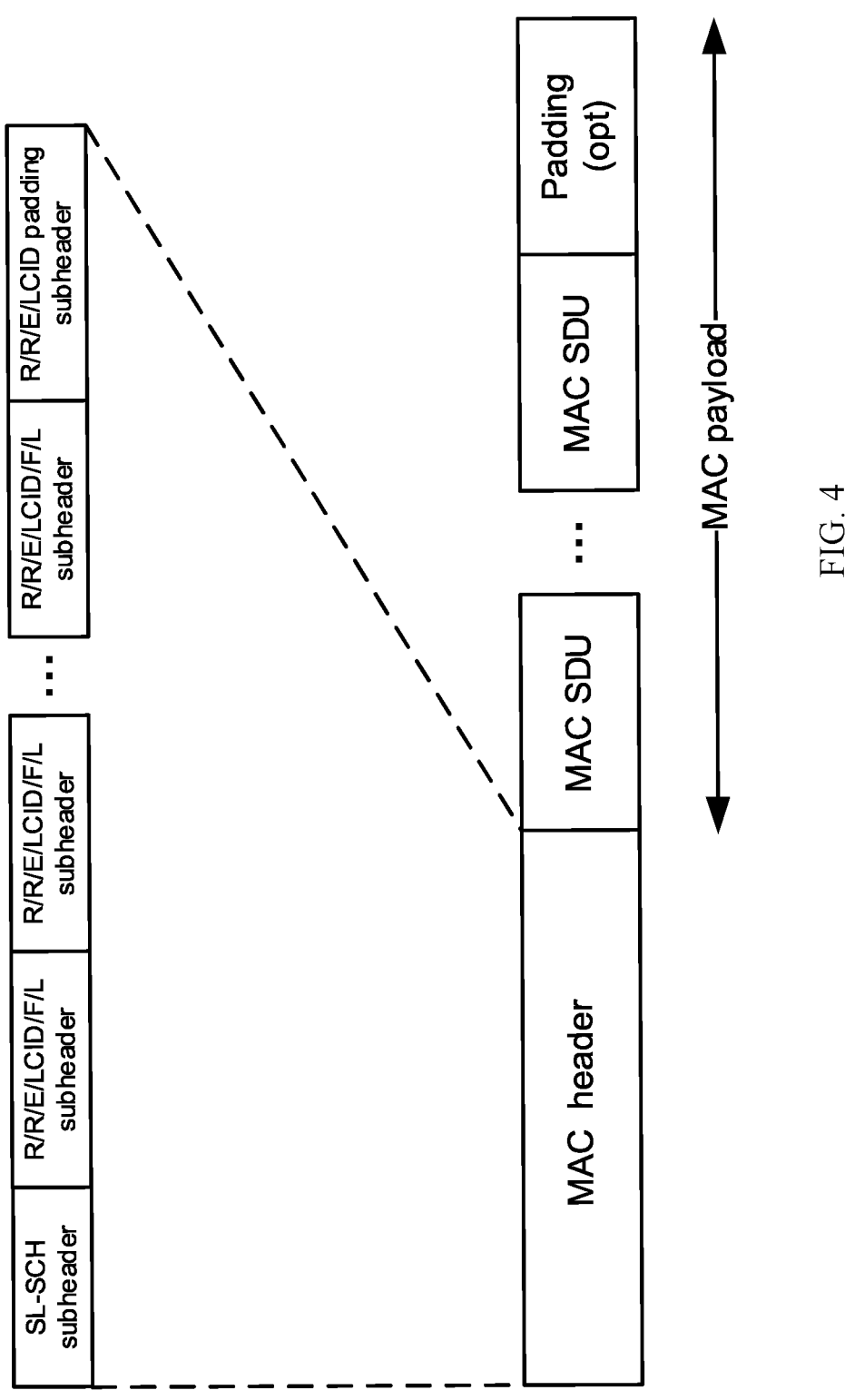
FIG. 4 is a schematic diagram illustrating a structure of a MAC PDU in accordance with an example of the disclosure.

Each MAC PDU can only be sent to one destination terminal, and each Medium Access Control Packet Data Unit (MAC PDU) contains only one Sidelink shared channel (SL-SCH) MAC subheader, where FIG. 4 illustrates the structure. In FIG. 4, the MAC header includes the MAC subheader, and the MAC payload includes a MAC Service Data Unit (SDU) and padding.

In the 5G era, in order to support enhanced V2X services and support higher transmission rates and higher reliability, unicast connections need to be established on the sidelink. In order to support the establishment and management of the unicast connections, the sidelink signaling radio bearer (SRB) is introduced to transmit control signaling configured to establish and manage the unicast connections. Each SRB corresponds to an individual logical channel (LCH).

Each logical channel has a respective priority for logical channel scheduling. This priority is configured by the network device. The network device configures for the terminal in the connected state through dedicated signaling, and configures for the terminal in the idle state through broadcast. The network device configures a priority for this logical channel according to the Quality of Service (QoS) of the data carried by the logical channel.

After the terminal receives one sidelink grant resource (or Sidelink grant), the terminal selects to transmit data through a following logical channel prioritization (LCP) method. First, a logical channel with a highest priority is selected, and the data to be transmitted on this logical channel is placed into the MAC PDU. A logical channel having a highest priority is selected among other logical channels of the destination terminal to which the selected logical channel belong, and the data to be transmitted on this logical channel is placed into the MAC PDU. Repeatedly place the data to be transmitted on the logical channel into the MAC PDU until the data to be transmitted on all the logical channels of the destination terminal is placed into the MAC PDU, or it cannot place more data in the Sidelink grant. The MAC PDU is submitted to the PHY layer for transmission.

On the Uu interface, the terminal uses the Token Bucket algorithm to select and place data on logical channels into the MAC PDU. The network device will configure the following parameter for each logical channel: logical channel priority, prioritized bit rate (whose unit is bit/s), bucket size duration (whose unit is second). The terminal maintains a bucket size ($B_j$, whose unit is bit) for each logical channel, and the service priority is initially to be 0. Whenever the terminal obtains a transmission grant resource, the service priority of each logical channel is increased by "prioritized bit rate*duration of transmission grant resource", and the service priority of each logical channel cannot exceed "prioritized bit rate*token bucket size".

After the terminal receives one sidelink grant resource, the terminal selects to transmit data through a following logical channel prioritization (LCP) method. In all of the logical channels each with the bucket size greater than 0, data about the bucket size on each logical channel is placed into the MAC PDU in a decreasing order of the logical channel priority. The size of data placed in the MAC PDU is subtracted from the bucket size of the logical channel. If it can still transmit data after the above steps are completed, the data on each logical channel is transmitted to the MAC PDU in the decreasing order of the logical channel priority, regardless of the bucket size.

In order to save power consumption of the terminal, the network device can configure discontinuous reception (DRX) parameter for the terminal. The DRX parameter include an inactive timer, an on-duration timer, a period, and a start offset. The terminal can only monitor the PDCCH when the inactivity timer starts and during an on duration and not monitor the PDCCH channel at other times, thereby saving power consumption. Whenever the terminal receives, on the PDCCH, the Downlink Control Information (DCI) carrying its own Cell-Radio Network Temporary Identifier (C-RNTI), the inactivity timer will be started. The terminal will periodically start the on-duration timer.

After configuring the DRX on the sidelink, for a destination terminal (receiving terminal), the transmitting terminal needs to transmit data within a wakeup window of the destination terminal to ensure that the destination terminal can receive the data. However, the current method of selecting the destination address of the logical channel based on the LCP does not consider the wakeup window of the destination terminal. If the destination terminal is in the sleeping state, transmitting data to the destination terminal will cause data loss. In addition, if within the wakeup window of the destination terminal, the logical channel of the destination terminal does not have the highest priority, the wakeup window will be missed, and it can only wait until the next wakeup window, resulting in data transmission delay.

In view of this, examples of the disclosure provide a method for selecting a destination address in a sidelink. The transmitting terminal selects the destination address configured to transmit data based on DRX parameters and DRX states of destination addresses of logical channels on which there are data to be transmitted and logical channel priorities to avoid transmitting data within the non-wakeup window, thereby avoiding data delay and data loss.

Figures 5, 6:
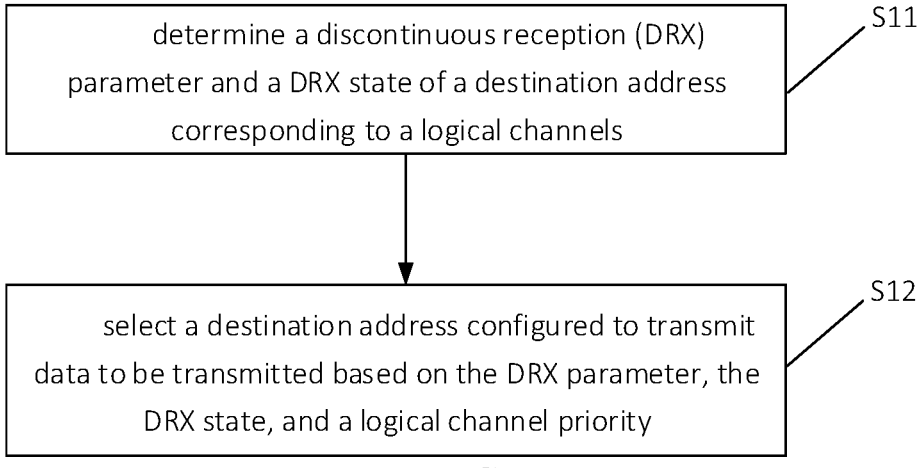
FIG. 5 is a flowchart illustrating a method for selecting a destination address in a sidelink in accordance with an example of the disclosure.
FIG. 6 is a block diagram illustrating a device for selecting a destination address in a sidelink in accordance with an example of the disclosure.

FIG. 5 is a flowchart illustrating a method for selecting a destination address in a sidelink in accordance with examples of the disclosure. As illustrated in FIG. 5, the method for selecting a destination address in a sidelink is applied to a terminal. The terminal may be a terminal that there is data to be transmitted on the sidelink. The method includes the following.

In step S11, a DRX parameter and a DRX state of a destination address corresponding to a logical channel are determined.

In examples of the disclosure, when the terminal obtains a sidelink grant resource, in selecting a destination address for transmitting data, it needs to determine the DRX parameters and the DRX states of destination terminals (e.g., the destination addresses of the logical channels on which there are data to be transmitted).

In step S12, a destination address configured to transmit the data to be transmitted is selected based on the DRX parameter, the DRX state, and a logical channel priority of the logical channel.

In examples of the disclosure, the terminal locally stores the DRX parameter of each destination address. The DRX state of each destination address can be calculated in real time based on the DRX parameter. The DRX state can include whether in a wakeup state. The destination address can be understood as a terminal or a terminal group.

In examples of the disclosure, the transmitting terminal selects the destination address configured to transmit data based on the DRX parameter and the DRX state of the destination address of the logical channel on which there is data to be transmitted and the logical channel priority, to transmit the data within the wakeup window of the destination terminal and avoid transmitting data within the non-wakeup window of the destination terminal, thereby avoiding data delay and data loss.

In examples of the disclosure, the method for selecting a destination address in a sidelink according to the foregoing examples will be described below in conjunction with practical applications.

In an implementation of examples of the disclosure, when the terminal obtains the sidelink grant resource, if there are one or more destination addresses corresponding to logical channels on which there are data to be transmitted are configured with the DRX and the DRX states are the wakeup state, the logical channels each with Bj greater than zero are determined from the logical channels corresponding to the one or more destination addresses, the destination address corresponding to a logical channel with a highest logical channel priority is selected from the logical channels each with the Bj greater than zero, and the data to be transmitted on logical channels of the destination address is placed in the sidelink grant resource.

In another implementation of examples of the disclosure, when the terminal obtains the sidelink grant resource, if there is a destination address corresponding to the logical channels on which there are data to be transmitted is not configured with the DRX parameter, or is configured with the DRX parameter and the DRX state is the wakeup state, logical channels each with Bj greater than zero are determined from the logical channels on which there are data to be transmitted, a destination address corresponding to the logical channel with a highest logical channel priority is selected among these logical channels each with Bj greater than zero, and the data to be transmitted on logical channels of this destination address is placed in the sidelink grant resource.

In an example, assuming that the terminal 1 has destination addresses 001, 010, and 011, where 001 and 010 are configured with the DRX. The destination address 001 corresponds to the logical channels LCH1 and LCH2, the destination address 010 corresponds to the logical channels LCH3 and LCH4, and the destination address 011 corresponds to the logical channels LCH5 and LCH6. The terminal 1 receives the DCI transmitted by the network device, where the DCI indicates the sidelink grant resource and at the same time indicates that the sidelink grant resource is used for the transmitting purpose of the DRX destination address. The terminal 1 determines that the current logical channels on which there are data to be transmitted and the corresponding Bj are: (LCH1, Bj is 5), (LCH3, Bj is 3), (LCH4, Bj is 6) and (LCH5, Bj is 8), and the destination addresses 001 and 010 are in the DRX wakeup state. In this case, the destination address 010 corresponding to the LCH4 that has the largest Bj among the LCH1, LCH3, and LCH4 in the DRX wakeup state is selected. The data to be transmitted on each of the logical channels LCH3 and LCH4 of the destination address 010 form a MAC PDU according to the LCP method and then is placed in the sidelink grant resource.

Further, in examples of the disclosure, in order to realize that the destination address configured with the DRX parameter and being in the wakeup state is giving priority to transmit data, followed by a destination address that is not configured with the DRX parameter, the network device can configure a logical channel priority offset for the terminal. The logical channel priority offset can be configured separately for each logical channel or can be configured for each destination address. In the case that the logical channel priority offset is configured for each destination address, all logical channels corresponding to one destination address adopt the same priority offset. In selecting the destination address by the terminal based on the priorities, the logical channel priority offset can be determined based on the logical channel or the destination address, and the sum of the original logical channel priority and the logical channel priority offset is determined as the final priority used to selecting the destination address.

It is understandable that the network device can configure different logical channel priority offsets for different logical channels of the terminal based on transmission priorities, to achieve transmitting data in the destination address configured with DRX parameter and being in the wakeup state firstly, and in the destination address that is not configured with the DRX parameter secondly. In an example, assuming that terminal 1 has destination addresses 001, 010, and 011, where 001 and 010 are configured with the DRX. The destination address 001 corresponds to the logical channels LCH1 and LCH2, the destination address 010 corresponds to the logical channels LCH3 and LCH4, and the destination address 011 corresponds to the logical channels LCH5 and LCH6. The logical channel priority offset (Bj offset) configured by the network device for the terminal is: (001, +4), (LCH5, −1). The terminal 1 receives the DCI sent by the network device, where the DCI indicates the sidelink grant resource and at the same time indicates that the sidelink grant resource is used for the transmitting purpose of the DRX destination address. The terminal 1 determines that the current logical channels on which there are data to be transmitted and the corresponding Bj are: (LCH1, Bj is 5), (LCH2, Bj is 3), (LCH4, Bj is 6) and (LCH5, Bj is 8), the destination address corresponding to 001 is currently in the DRX wakeup state, and the destination address corresponding to 010 is currently in the DRX sleeping state. Bj of LCH1, LCH2 and LCH5 are updated respectively according to the logical channel priority offset to 5+4=9, 3+4=7 and 8−1=7. The destination address 001 corresponding to the LCH1 having the highest updated Bj is selected, and the data to be transmitted on the LCH1 and LCH2 form a MAC PDU according to the LCP and then is placed in the sidelink grant resource.

Further, in examples of the disclosure, after the destination address is selected, the data to be transmitted on respective logical channels corresponding to the destination address can be transmitted on the designated sidelink grant resource. The designated sidelink grant resource may be determined based on the DCI transmitted by the network device, or may be determined based on pre-configuration information (for example, pre-specified by a protocol), or autonomously selected by the terminal.

In an implementation of examples of the disclosure, when the terminal obtains the sidelink grant resource, if a destination address corresponding to one or more logical channels on which there are data to be transmitted is configured with the DRX parameter and is in a sleeping state, the destination address configured with DRX parameter and being in the sleeping state is ignored in selecting the destination address to avoid transmitting data in the destination address being in the sleeping state.

In examples of the disclosure, based on whether the destination addresses corresponding to the logical channels on which there are data to be transmitted are configured with the DRX parameter and whether the DRX states are the wakeup state, different destination address selection methods are provided to achieve that the destination address configured with the DRX parameter and being in the wakeup state is giving priority to transmit data, followed by a destination address that is not configured with the DRX parameter. In addition, the destination address that is configured with DRX parameter and being in the sleeping state is ignored, so as to avoid transmitting data in the destination address in the sleeping state. Through the disclosure, data delay and data loss can be avoided.

Based on the same concept, examples of the disclosure further provide a device for selecting a destination address in sidelink.

It is understandable that, in order to realize the above-mentioned functions, the device for selecting a destination address in a sidelink according to examples of the disclosure includes hardware structures and/or software modules corresponding to each function. In combination with the units and algorithm steps of the examples disclosed in examples of the disclosure, the examples of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the examples of the disclosure.

FIG. 6 is a block diagram illustrating a device for selecting a destination address in sidelink in accordance with an example of the disclosure. As illustrated in FIG. 6, the device 100 for selecting a destination address in sidelink is applied to a terminal and includes a determining unit 101 and a selecting unit 102. The determining unit 101 is configured to determine a discontinuous reception (DRX) parameter and a DRX state of a destination address corresponding to a logical channel, where the logical channel is a logical channel on which there is data to be transmitted. The selecting unit 102 is configured to select a destination address configured to transmit the data to be transmitted based on the DRX parameter, the DRX state, and a logical channel priority of the logical channels.

In an implementation, the selecting unit 102 is configured to, in response to there being one or more destination addresses configured with the DRX parameter and the DRX state being a wakeup state, select logical channels each with a bucket size greater than zero from logical channels corresponding to the one or more destination addresses, and select a destination address corresponding to a logical channel with a highest priority from the logical channels each with the bucket size greater than zero.

In another implementation, the selecting unit 102 is configured to, in response to there being a destination address not configured with the DRX parameter or configured with the DRX parameter and being in a wakeup state, determine a logical channel with a bucket size greater than zero from logical channels on which there are data to be transmitted, and select a destination channel corresponding to a logical channel with a highest priority from the logical channels with the bucket size greater than zero.

In another implementation, the priority is determined based on a sum of an original logical channel priority and a logical channel priority offset.

In another implementation, the logical channel priority offset is determined based on the logical channel or is determined based on the destination address.

In another implementation, the device 100 further includes a transmitting unit 103. The transmitting unit 103 is configured to: on a designated sidelink grant resource, transmit the data to be transmitted on respective logical channels corresponding to the destination address.

In another implementation, the designated sidelink grant resource is determined based on downlink control information or based on pre-configuration information or is autonomously selected by the terminal.

In another implementation, the selecting unit 102 is further configured to, in response to the destination address being configured with the DRX parameter and being in a sleeping state, ignore the destination address configured with the DRX parameter and being in the sleeping state.

Regarding the device in the foregoing example, the specific manner in which each module performs operation has been described in detail in the example of the method, and detailed description will not be given here.

Figure 7:
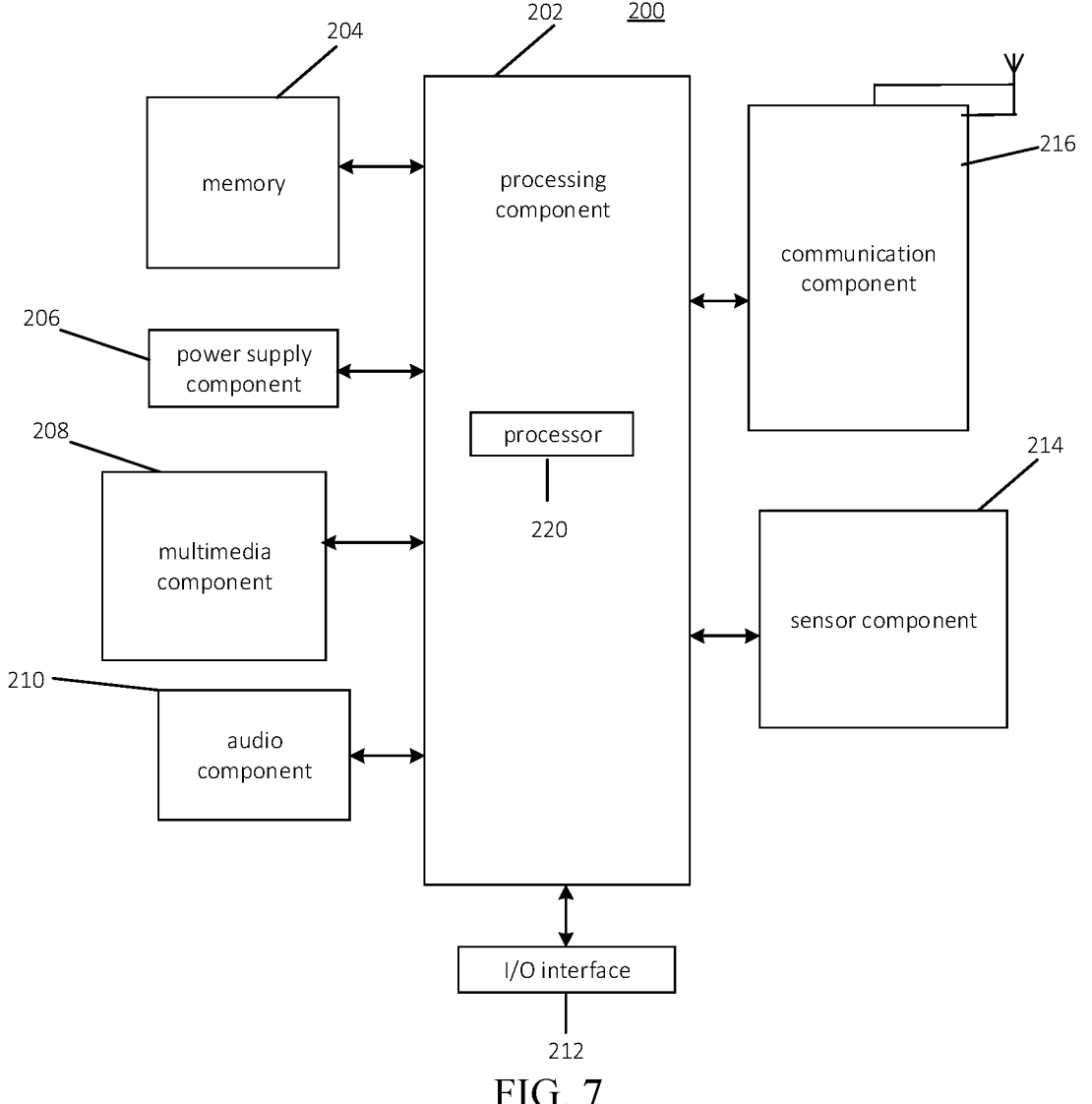
FIG. 7 is a block diagram illustrating a device in accordance with an example of the disclosure.

FIG. 7 is a block diagram illustrating a device 200 for selecting a destination address in a sidelink in accordance with an example of the disclosure. For example, the apparatus 200 may be a mobile phone, a computer, a digital broadcasting terminal, a messaging device, a game console, a tablet device, a medical device, a fitness device, a personal digital assistant, etc.

As illustrated in FIG. 7, the device 200 may include one or more of the following components: a processing component 202, a memory 204, a power supply component 206, a multimedia component 208, an audio component 210, an input/output (I/O) interface 212, a sensor component 214, and a communication component 216.

The processing component 202 generally controls the overall operations of the device 200, such as operations associated with display, telephone calls, data communications, camera operations, and recording operations. The processing component 202 may include one or more processors 220 to execute instructions to complete all or part of the steps of the foregoing method. In addition, the processing component 202 may include one or more modules to facilitate the interaction between the processing component 202 and other components. For example, the processing component 202 may include a multimedia module to facilitate the interaction between the multimedia component 208 and the processing component 202.

The memory 204 is configured to store various types of data to support the operation of the device 200. Examples of these data include instructions for operating any application or method on the device 200, contact data, phone book data, messages, pictures, videos, etc. The memory 204 can be implemented by any type of volatile or non-volatile storage device or a combination thereof, such as static random access memory (SRAM), electrically erasable programmable read-only memory (EEPROM), erasable and programmable read only memory (EPROM), programmable read only memory (PROM), read only memory (ROM), magnetic memory, flash memory, magnetic disk or optical disk.

The power supply component 206 provides power to various components of the device 200. The power supply component 206 may include a power management system, one or more power supplies, and other components associated with generating, managing, and distributing power for the device 200.

The multimedia component 208 includes a screen that provides an output interface between the device 200 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The touch sensor may not only sense the boundary of the touch or swipe action, but also detect the duration and pressure related to the touch or swipe action. In some examples, the multimedia component 208 includes a front-facing camera and/or a rear-facing camera. When the device 200 is in an operation mode, such as a shooting mode or a video mode, the front-facing camera and/or the rear-facing camera can receive external multimedia data. Each of the front-facing camera and rear-facing cameras can be a fixed optical lens system or have focal length and optical zoom capabilities.

The audio component 210 is configured to output and/or input audio signals. For example, the audio component 210 includes a microphone (MIC) that is configured to receive external audio signals when the apparatus 800 is in operating modes, such as call mode, recording mode, and voice recognition mode. The microphone is configured to receive external audio signals. The received audio signal can be further stored in the memory 204 or sent via the communication component 216. In some examples, the audio component 210 further includes a speaker for outputting audio signals.

The I/O interface 212 is configured to provide an interface between the processing component 202 and a peripheral interface module. The above-mentioned peripheral interface module may be a keyboard, a click wheel, a button, and the like. These buttons may include, but are not limited to: home button, volume button, start button, and lock button.

The sensor component 214 includes one or more sensors for providing status assessment of various aspects of the device 200. For example, the sensor component 214 can detect the on/off status of the device 200 and the relative positioning of components, such as the display and keypad of the device 200. The sensor component 214 can also detect a change in the position of the device 200 or a component of the device 200, the presence or absence of contact with the device 200, the orientation or acceleration/deceleration of the device 200 and the temperature change of the device 200. The sensor component 214 may include a proximity sensor configured to detect the presence of nearby objects in the absence of any physical contact. The sensor component 214 may also include a light sensor, such as a complementary metal oxide semiconductor (CMOS) or charge-coupled device (CCD) image sensor, for use in imaging applications. In some examples, the sensor component 214 may also include an acceleration sensor, a gyroscope sensor, a magnetic sensor, a pressure sensor, or a temperature sensor.

The communication component 216 is configured to facilitate wired or wireless communication between the device 200 and other devices. The device 200 can access a wireless network based on a communication standard, such as WiFi, 2G, or 3G, or a combination thereof. In some examples, the communication component 216 receives broadcast signals or broadcast related information from an external broadcast management system via a broadcast channel. In an example, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some examples, the device 200 may be implemented by one or more application specific integrated circuits (ASIC), digital signal processors (DSP), digital signal processing equipment (DSPD), programmable logic devices (PLD), field programmable Agate array (FPGA), controller, microcontroller, microprocessor, or other electronic component implementation for performing the above methods.

In an example, there is also provided a non-transitory computer-readable storage medium including instructions, such as a memory 204 including instructions. The instructions are executable by the processor 220 of the device 200 to perform the above method. For example, the non-transitory computer-readable storage medium may be ROM, random access memory (RAM), CD-ROM, magnetic tape, floppy disk, optical data storage device, and the like.

It is understandable that in the disclosure, "a plurality of" refers to two or more than two, and other quantifiers are similar. The term "and/or" describes the association relationship of the associated object, indicating three types of relationships, for example only A, only B, or both A and B. The character "/" generally indicates that the associated objects before and after are in an "or" relationship. The singular forms "a", "said" and "the" are also intended to include plural forms, unless the context clearly indicates other meanings.

It is understandable that the terms "first", "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as first information.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

It is understandable that although the operations in examples of the disclosure are described in a specific order in the drawings, they should not be understood as requiring these operations to be performed in the specific order shown or in a serial order, or requiring to perform all the operations shown to get the desired result. In certain circumstances, multitasking and parallel processing may be advantageous.

Those skilled in the art will easily think of other examples of the disclosure after considering the specification and practicing the disclosure described herein. This disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the examples are to be regarded as examples only, and the true scope and spirit of the disclosure are pointed out by the following claims.

It is understandable that the disclosure is not limited to the precise structure that has been described above and shown in the drawings, and various modifications and changes can be made without departing from its scope. The scope of the disclosure is only limited by the appended claims.

What is claimed is:

1. A method for selecting a destination address in a sidelink, the method comprising:

determining, by a terminal with data to be transmitted on the sidelink, a discontinuous reception (DRX) parameter and a DRX state of a destination address corresponding to a logical channel, wherein the data to be transmitted is configured to transmit on the logical channel, and the DRX state is one of a wakeup state or a sleeping state; and selecting, by the terminal, a destination address configured to transmit the data to be transmitted based on the DRX parameter, the DRX state and a logical channel priority of the logical channel;

wherein the logical channel priority is determined based on a sum of an original logical channel priority and a logical channel priority offset, wherein the logical channel priority offset is determined based on the destination address.

2. The method of claim 1, wherein selecting the destination address configured to transmit the data to be transmitted based on the DRX parameter, the DRX state and the logical channel priority comprises:

determining logical channels each with a bucket size greater than zero among logical channels corresponding to one or more destination addresses; and selecting a destination address corresponding to a logical channel with a highest logical channel priority among the logical channels each with the bucket size greater than zero;

wherein the one or more destination addresses are configured with the DRX parameter and the DRX state is the wakeup state.

3. The method of claim 1, further comprising:

transmitting the data to be transmitted in respective logical channels corresponding to the destination address on a sidelink grant resource.

4. The method of claim 3, wherein the sidelink grant resource is determined based on downlink control information, or is autonomously selected by the terminal.

5. The method of claim 1, further comprising:

ignoring a destination address configured with the DRX parameter and being in the sleeping state;

wherein the destination address is configured with the DRX parameter and the DRX state is the sleeping state.

6. The method of claim 1, wherein selecting the destination address configured to transmit the data to be transmitted based on the DRX parameter, the DRX state and the logical channel priority comprises:

determining a logical channel with a bucket size greater than zero among logical channels on which there are data to be transmitted; and selecting a destination address corresponding to a logical channel with a highest logical channel priority among the logical channels with the bucket size greater than zero;

wherein the destination address is configured with the DRX parameter and the DRX state is the wakeup state.

7. A device for selecting a destination address in a sidelink, comprising:

a processor; and a memory for storing instructions executable by the processor;

wherein, the processor is configured to:

determine a discontinuous reception (DRX) parameter and a DRX state of a destination address corresponding to a logical channel, wherein data to be transmitted is configured to transmit on the logical channel, and the DRX state is one of a wakeup state or a sleeping state; and select a destination address configured to transmit the data to be transmitted based on the DRX parameter, the DRX state and a logical channel priority of the logical channel;

wherein the logical channel priority is determined based on a sum of an original logical channel priority and a logical channel priority offset, wherein the logical channel priority offset is determined based on the destination address.

8. The device of claim 7, wherein the processor is configured to:

determine logical channels each with a bucket size greater than zero among logical channels corresponding to one or more destination addresses; and select a destination address corresponding to a logical channel with a highest logical channel priority among the logical channels each with the bucket size greater than zero;

wherein the one or more destination addresses are configured with the DRX parameter and the DRX state is the wakeup state.

9. The device of claim 7, wherein the processor is further configured to:

transmit the data to be transmitted in respective logical channels corresponding to the destination address on a sidelink grant resource.

10. The device of claim 9, wherein the designated sidelink grant resource is determined based on downlink control information, or is autonomously selected by the terminal.

11. The device of claim 7, wherein the processor is configured to:

determine a logical channel with a bucket size greater than zero among logical channels on which there are data to be transmitted; and select a destination address corresponding to a logical channel with a highest logical channel priority among the logical channels with the bucket size greater than zero;

wherein the destination address is configured with the DRX parameter and the DRX state is the wakeup state.

12. A non-transitory computer-readable storage medium, wherein when instructions in the storage medium are executed by a processor of a mobile terminal, the mobile terminal is caused to perform the method for selecting a destination address in a sidelink, the method comprising:

determining, by a terminal with data to be transmitted on the sidelink, a discontinuous reception (DRX) parameter and a DRX state of a destination address corresponding to a logical channel, wherein the data to be transmitted is configured to transmit on the logical channel, and the DRX state is one of a wakeup state or a sleeping state; and selecting, by the terminal, a destination address configured to transmit the data to be transmitted based on the DRX parameter, the DRX state and a logical channel priority of the logical channel;

wherein the logical channel priority is determined based on a sum of an original logical channel priority and a logical channel priority offset, wherein the logical channel priority offset is determined based on the destination address.

13. The non-transitory computer-readable storage medium of claim 12, wherein selecting the destination address configured to transmit the data to be transmitted based on the DRX parameter, the DRX state and the logical channel priority of the logical channel comprises:

determining logical channels each with a bucket size greater than zero among logical channels corresponding to one or more destination addresses; and selecting a destination address corresponding to a logical channel with a highest logical channel priority among the logical channels each with the bucket size greater than zero;

wherein the one or more destination addresses are configured with the DRX parameter and the DRX state is the wakeup state.

14. The non-transitory computer-readable storage medium of claim 12, wherein the method further comprises:

transmitting the data to be transmitted in respective logical channels corresponding to the destination address on a sidelink grant resource.

15. The non-transitory computer-readable storage medium of claim 12, wherein the sidelink grant resource is determined based on downlink control information, or is autonomously selected by the terminal.

16. The non-transitory computer-readable storage medium of claim 12, wherein the method further comprises:

determining a logical channel with a bucket size greater than zero among logical channels on which there are data to be transmitted; and selecting a destination address corresponding to a logical channel with a highest logical channel priority among the logical channels with the bucket size greater than zero;

wherein the destination address is configured with the DRX parameter and the DRX state is the wakeup state.

* * * * *